US012562610B2

(12) United States Patent
Hwang et al.

(10) Patent No.: US 12,562,610 B2
(45) Date of Patent: Feb. 24, 2026

(54) ROTOR MODULE WITH COOLING STRUCTURE

(71) Applicant: HYUNDAI MOBIS CO., LTD., Seoul (KR)

(72) Inventors: In Guk Hwang, Gwangmyeong-si (KR); Byung Ryel In, Yongin-si (KR); Sung Wook Lee, Yongin-si (KR); Tae Wook Ha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 149 days.

(21) Appl. No.: 18/383,566

(22) Filed: Oct. 25, 2023

(65) Prior Publication Data

US 2024/0429763 A1 Dec. 26, 2024

(30) Foreign Application Priority Data

Jun. 21, 2023 (KR) ........................ 10-2023-0079573

(51) Int. Cl.
*H02K 1/32* (2006.01)
*H02K 7/00* (2006.01)
(52) U.S. Cl.
CPC .............. *H02K 1/32* (2013.01); *H02K 7/003* (2013.01)
(58) Field of Classification Search
CPC ................................. H02K 1/32; H02K 7/003
See application file for complete search history.

(56) References Cited

U.S. PATENT DOCUMENTS

| | | | |
|---|---|---|---|
| 2009/0261667 A1 | 10/2009 | Matsubara et al. | |
| 2017/0133912 A1 | 5/2017 | Gi et al. | |
| 2019/0199152 A1* | 6/2019 | Weinmeister | ............ H02K 1/28 |
| 2019/0207480 A1 | 7/2019 | Yamaguchi | |
| 2020/0036249 A1 | 1/2020 | Krais et al. | |
| 2021/0281134 A1* | 9/2021 | Lux | .......................... H02K 1/32 |

FOREIGN PATENT DOCUMENTS

| | | | | |
|---|---|---|---|---|
| CN | 110784037 A | 2/2020 | | |
| CN | 111384795 A | 7/2020 | | |
| CN | 114552832 A | 5/2022 | | |
| DE | 10 2011 117 517 A1 | 5/2013 | | |
| DE | 10 2021 111 321 A1 | 11/2022 | | |
| JP | 9-182375 A | 7/1997 | | |
| JP | 4560067 B2 * | 10/2010 | .......... | H02K 1/2766 |
| KR | 10-2022-0096306 A | 7/2022 | | |

(Continued)

OTHER PUBLICATIONS

Extended European Search report issued on Oct. 10, 2024 in corresponding EP Patent Application 24164504.3.

(Continued)

*Primary Examiner* — Terrance L Kenerly
(74) *Attorney, Agent, or Firm* — Morgan, Lewis & Bockius LLP

(57) ABSTRACT

Provided is a rotor, and more particularly, a rotor with improved cooling efficiency. The rotor module with a cooling structure of the present disclosure may more directly cool a rotor, thereby securing improved performance of a motor by the rotor directly equipped with a cooling structure including a cooling passage passing through the inside of a rotor core.

8 Claims, 15 Drawing Sheets

(56)                         References Cited

FOREIGN PATENT DOCUMENTS

WO          2015/087445  A1      6/2015

OTHER PUBLICATIONS

Office Action issued on Jan. 18, 2025 in Korean Patent Application
No. 10-2023-0079573 Note: JPWO 2015/087445 and CN 110784037
cited therein are already of record.
Office Action issued on Jun. 21, 2024 in Korean Patent Application
No. 2023-0079573.
Office Action issued on Sep. 23, 2025 in Korean Patent Application
No. 10-2023-0079573.

* cited by examiner

[FIG. 1]
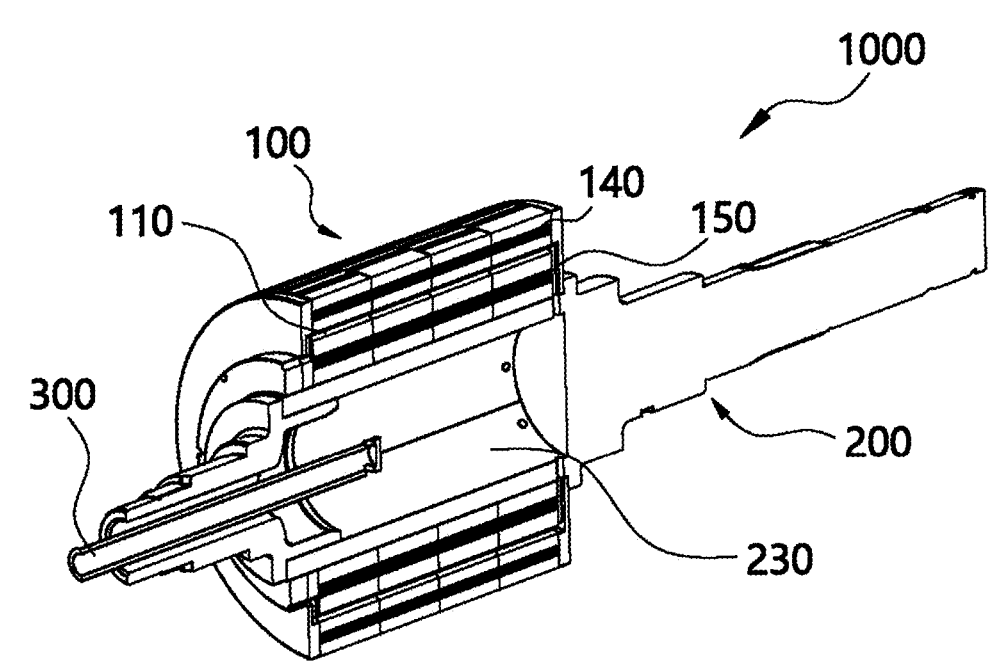

[FIG. 2]
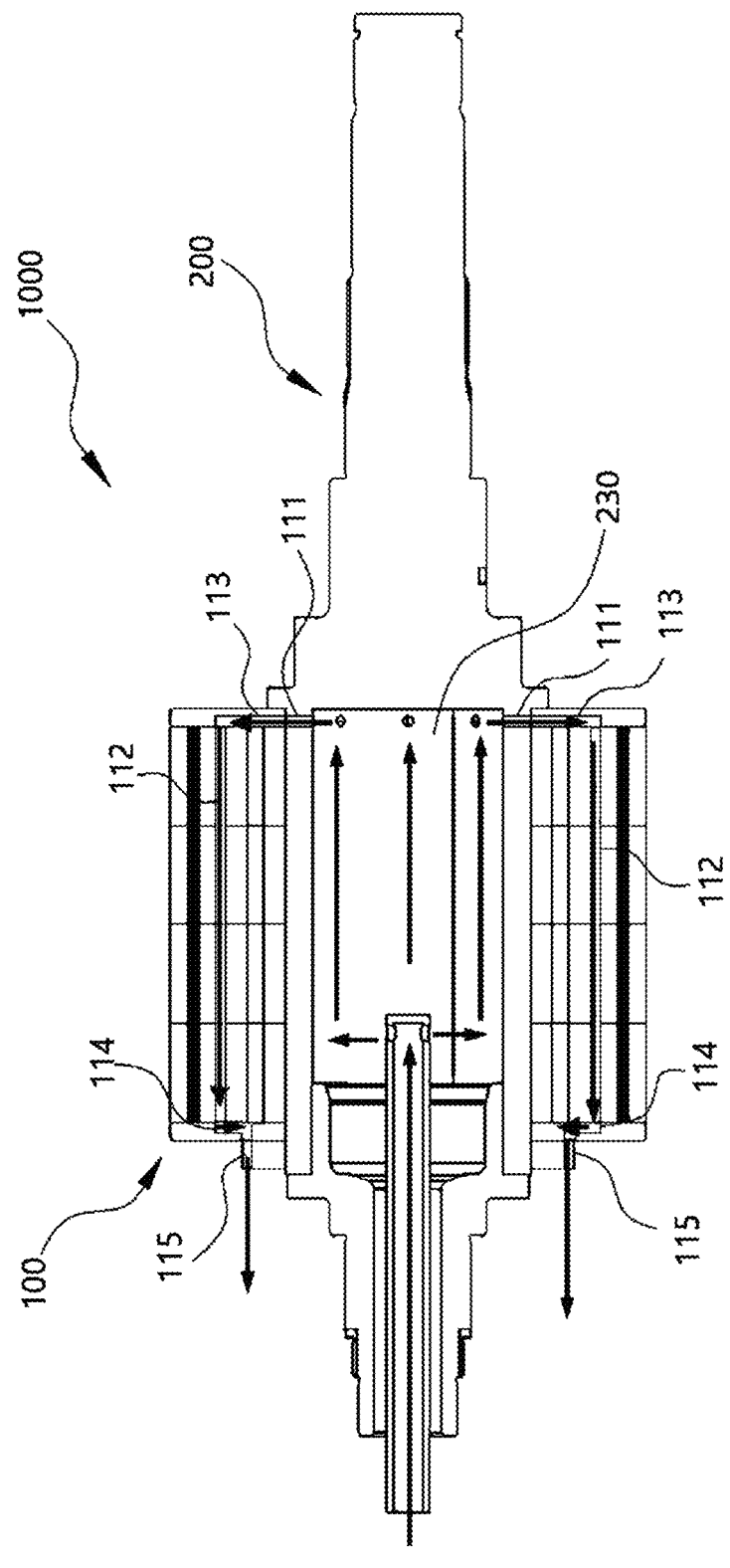

[FIG. 3]
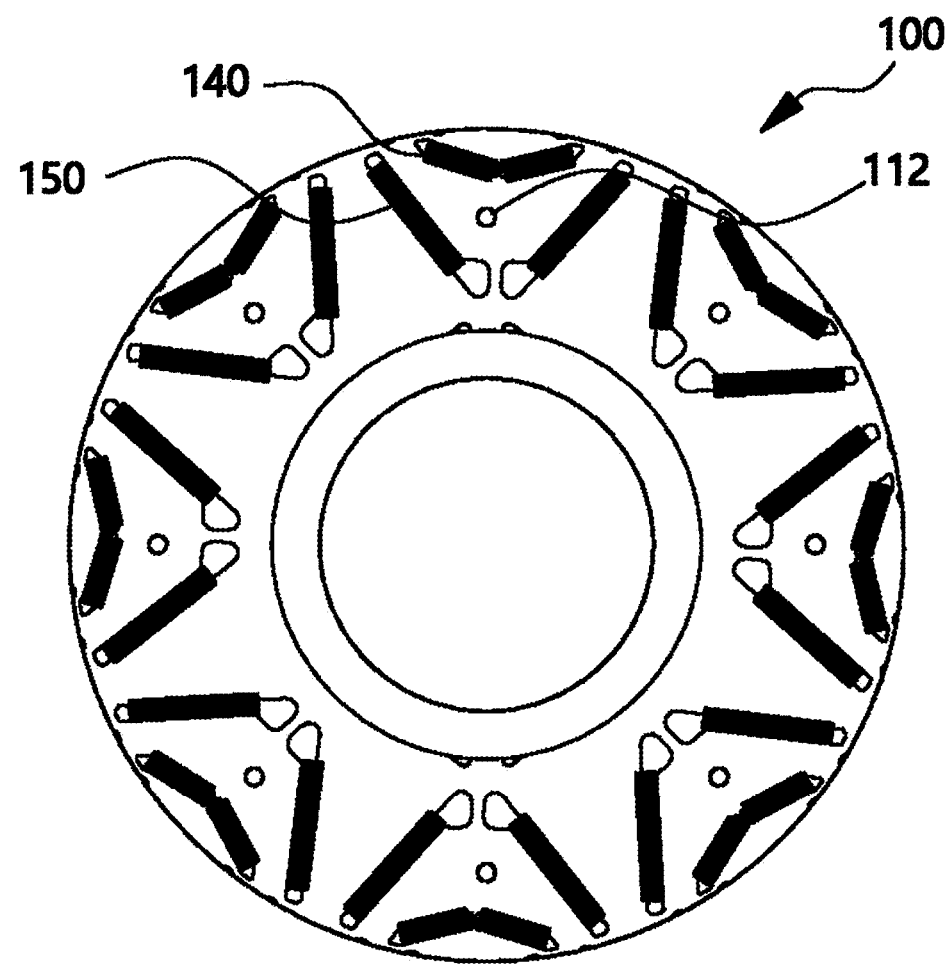

[FIG. 4]
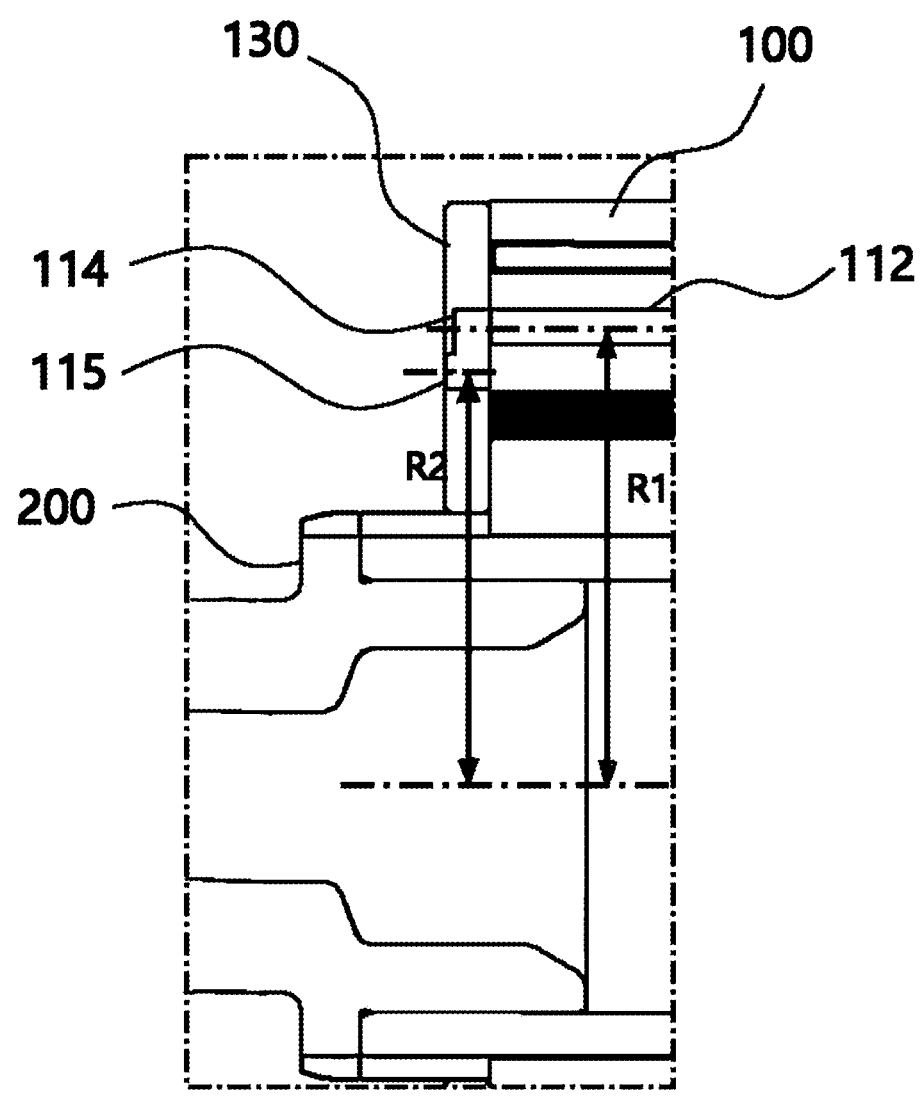

[FIG. 5]
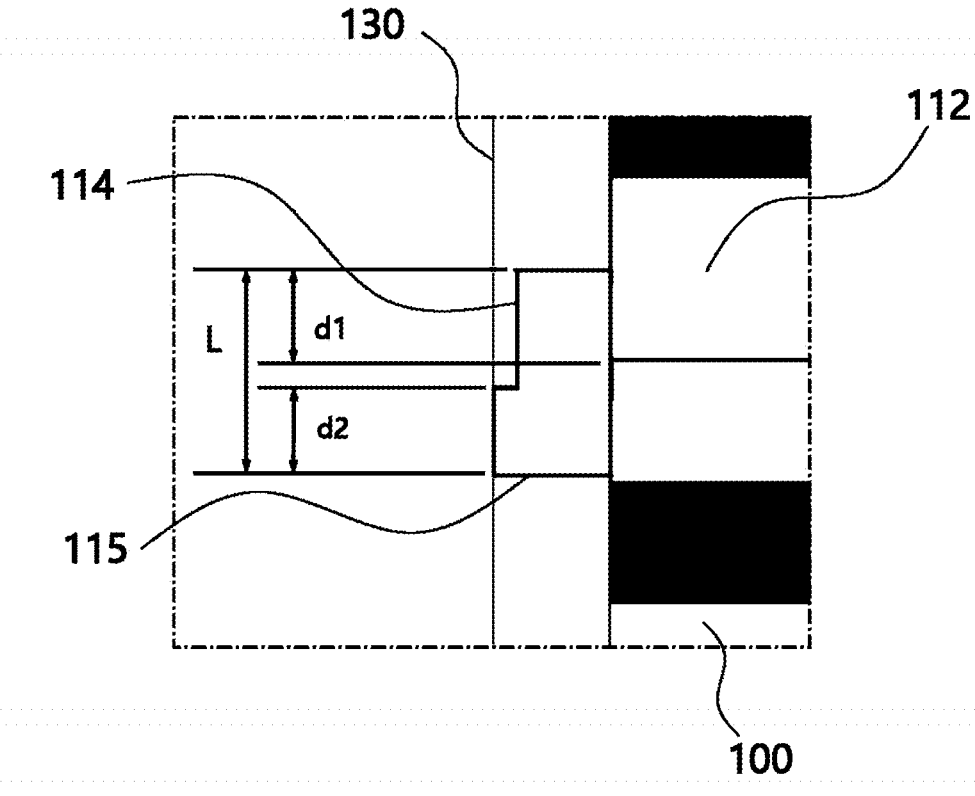

[FIG. 6]
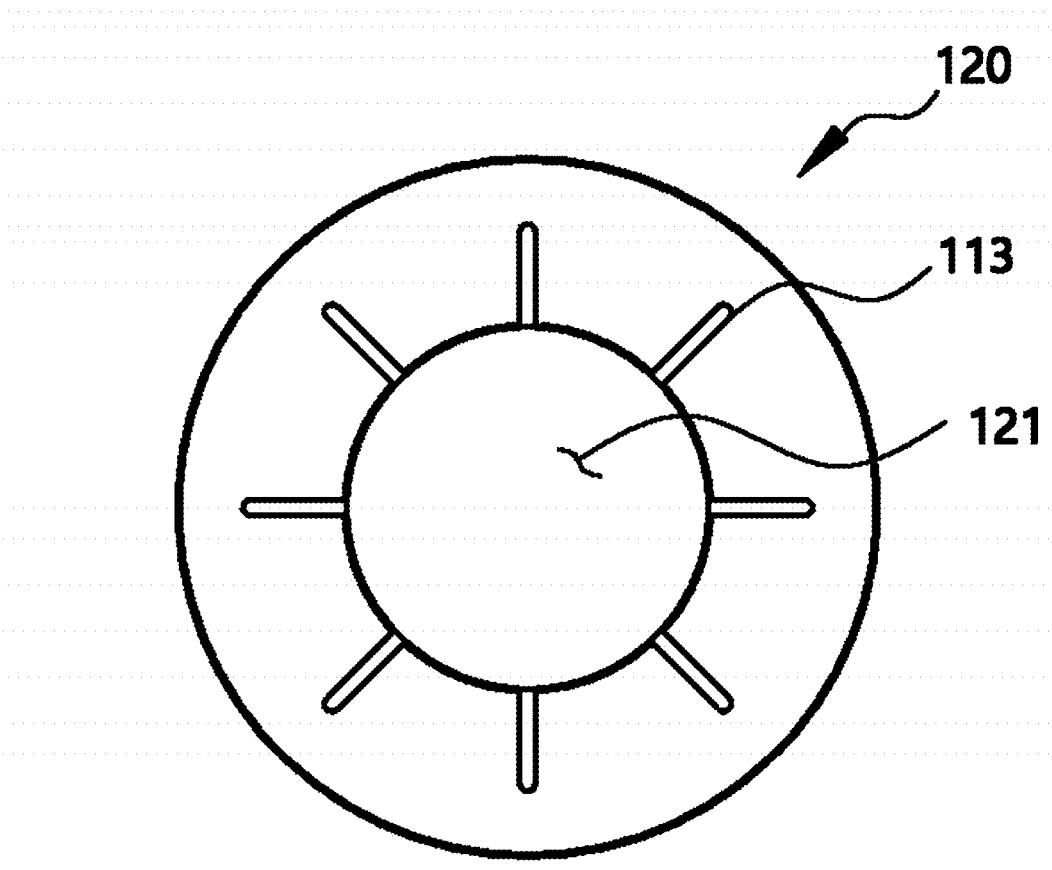

[FIG. 7]
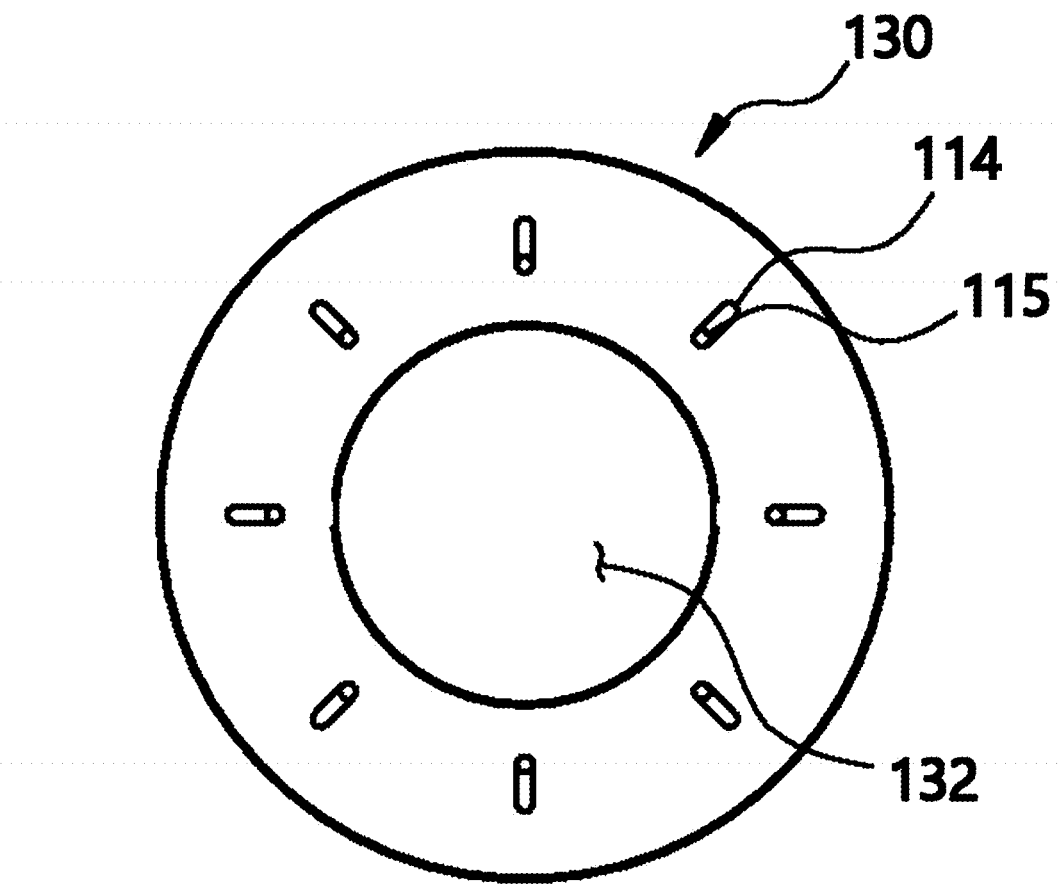

[FIG. 8]
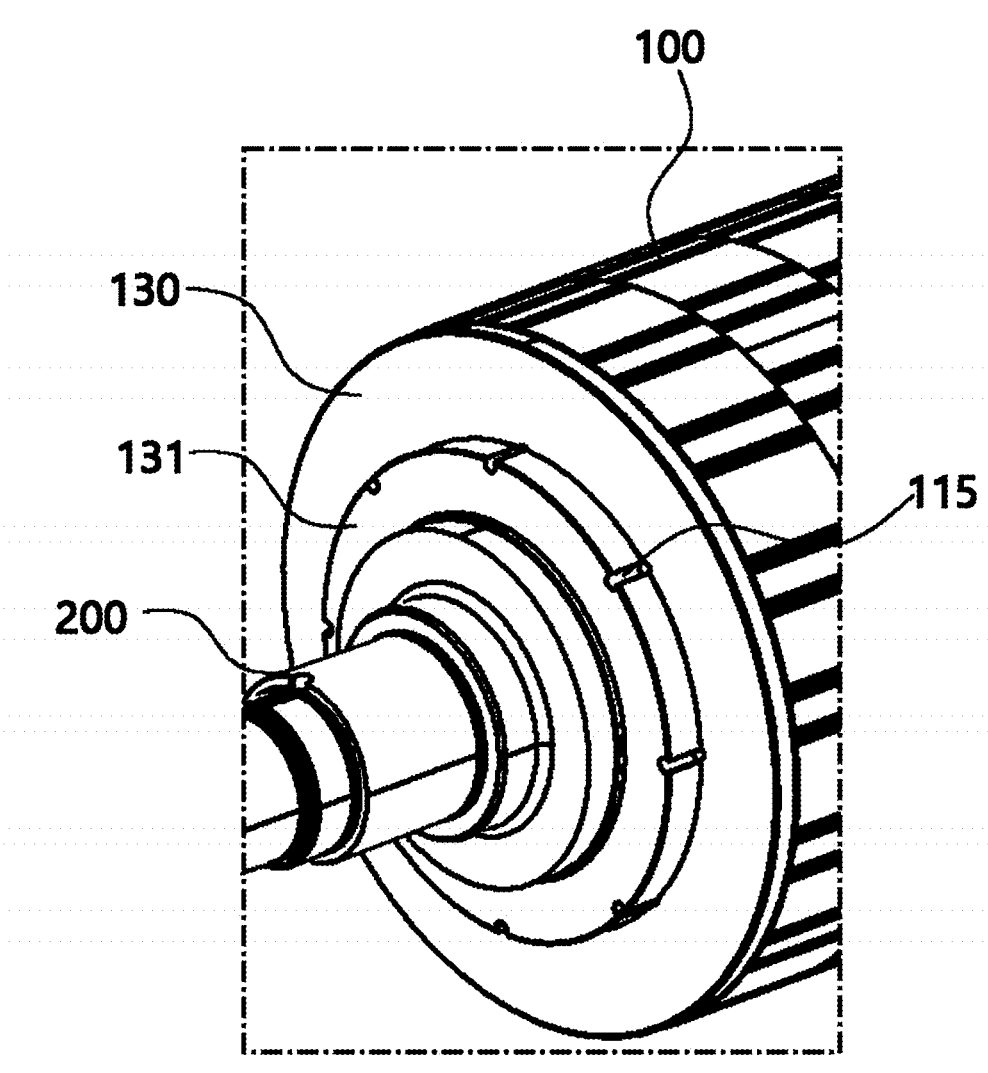

[FIG. 9]
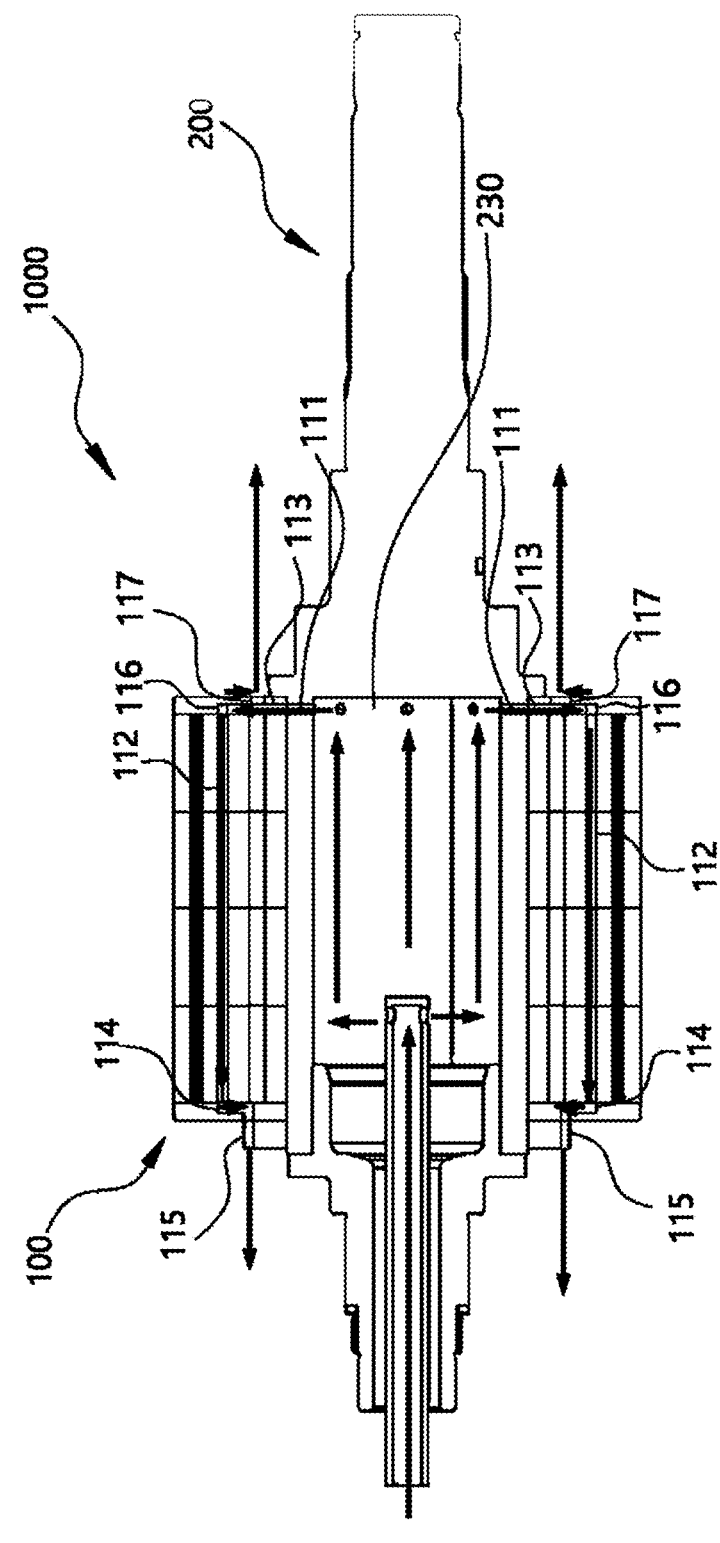

[FIG. 10]
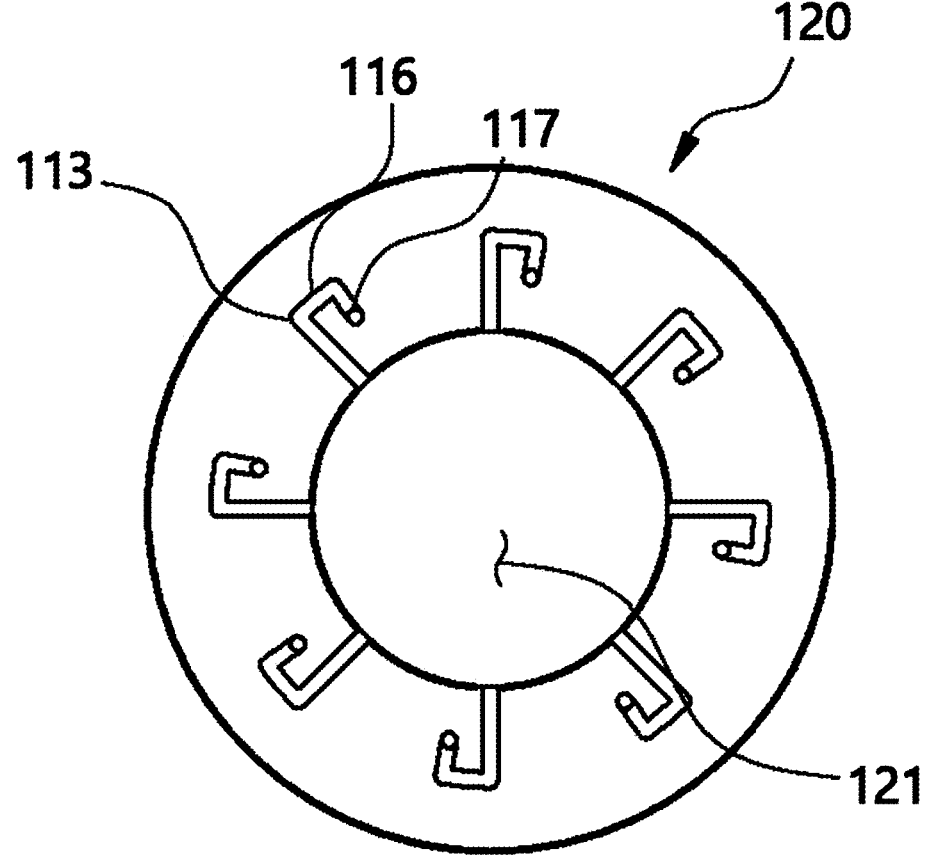

[FIG. 11]
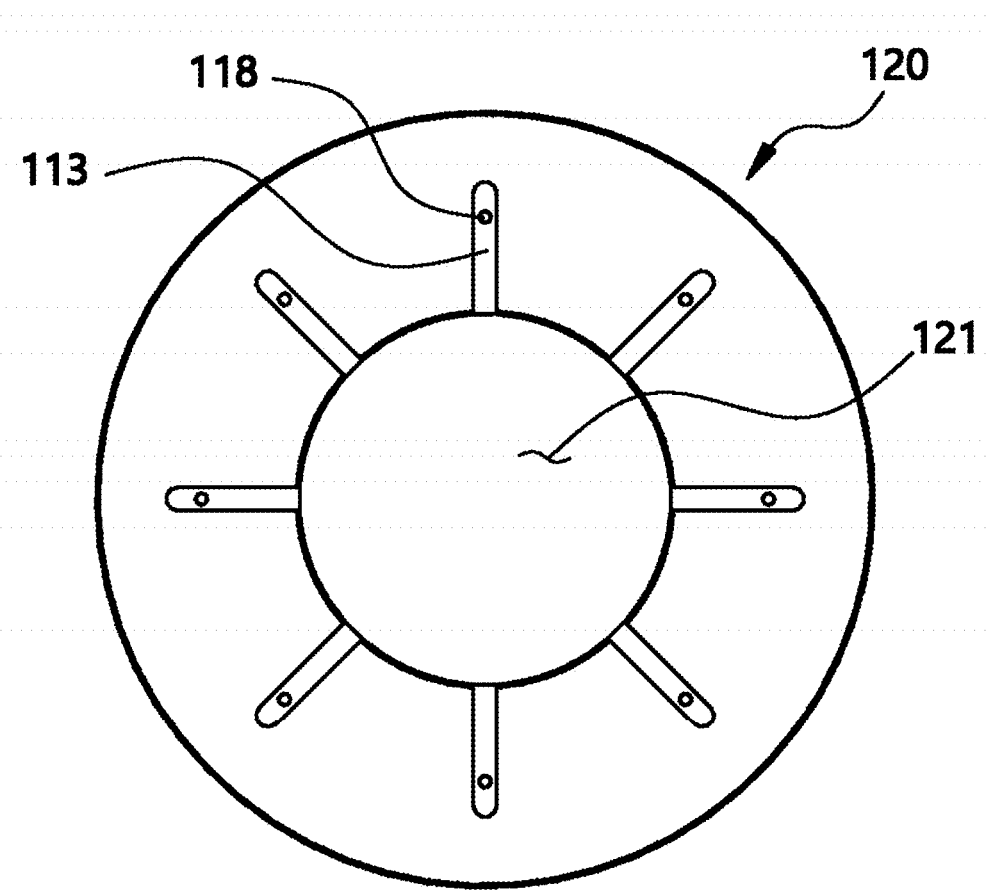

[FIG. 12]
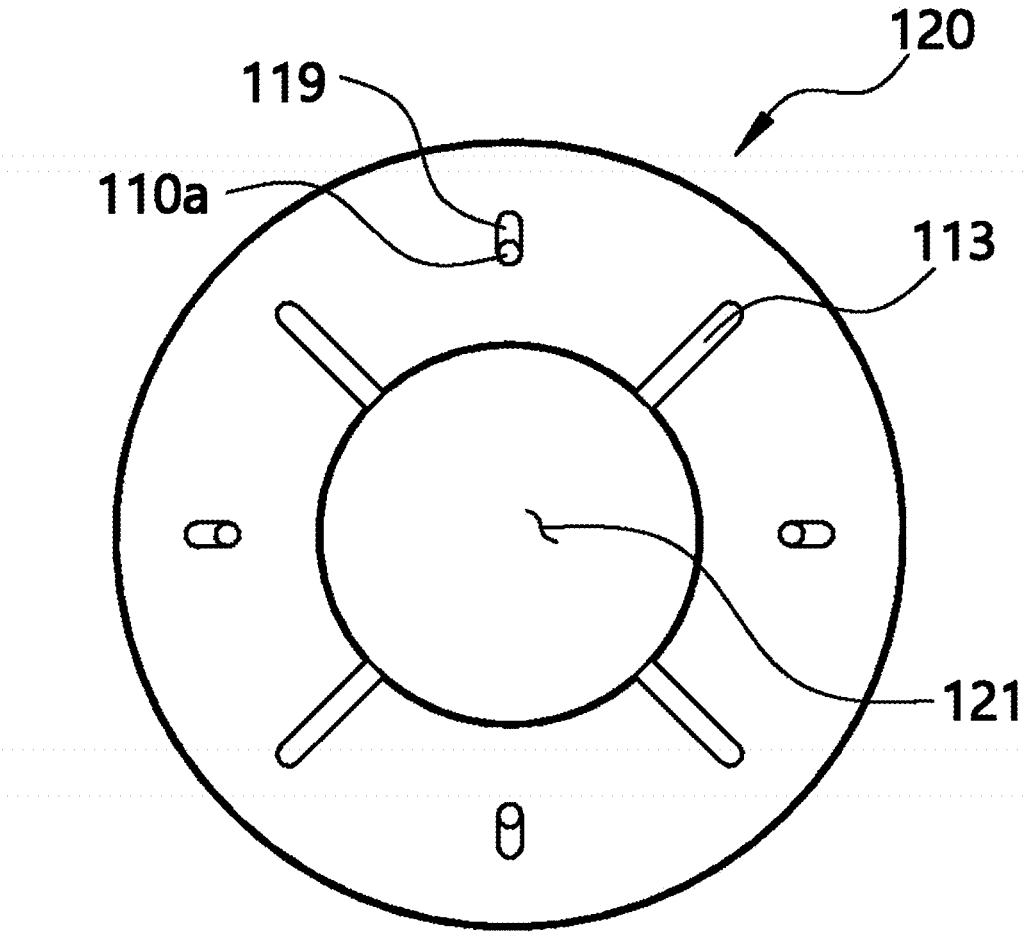

[FIG. 13]
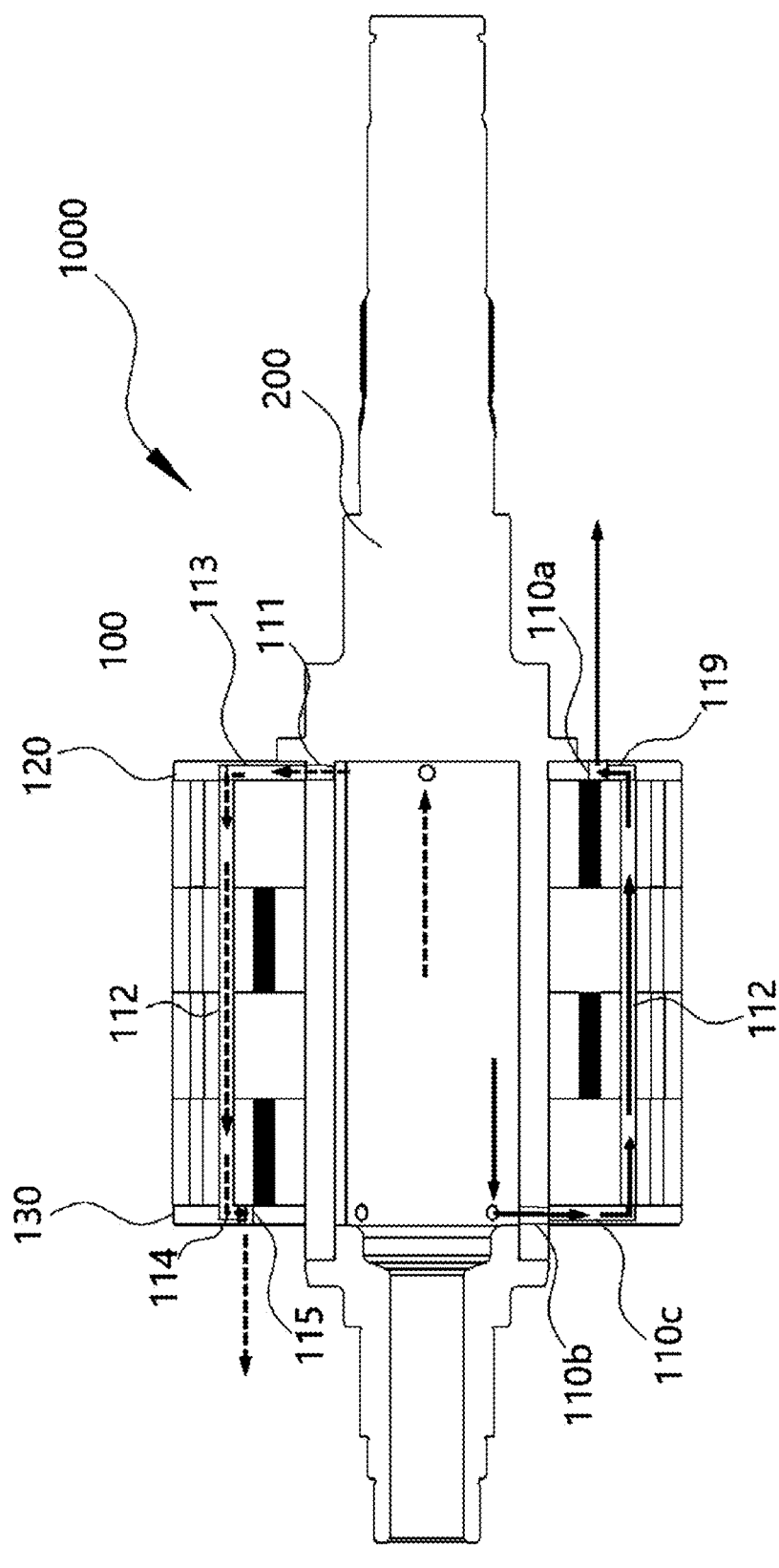

[FIG. 14]
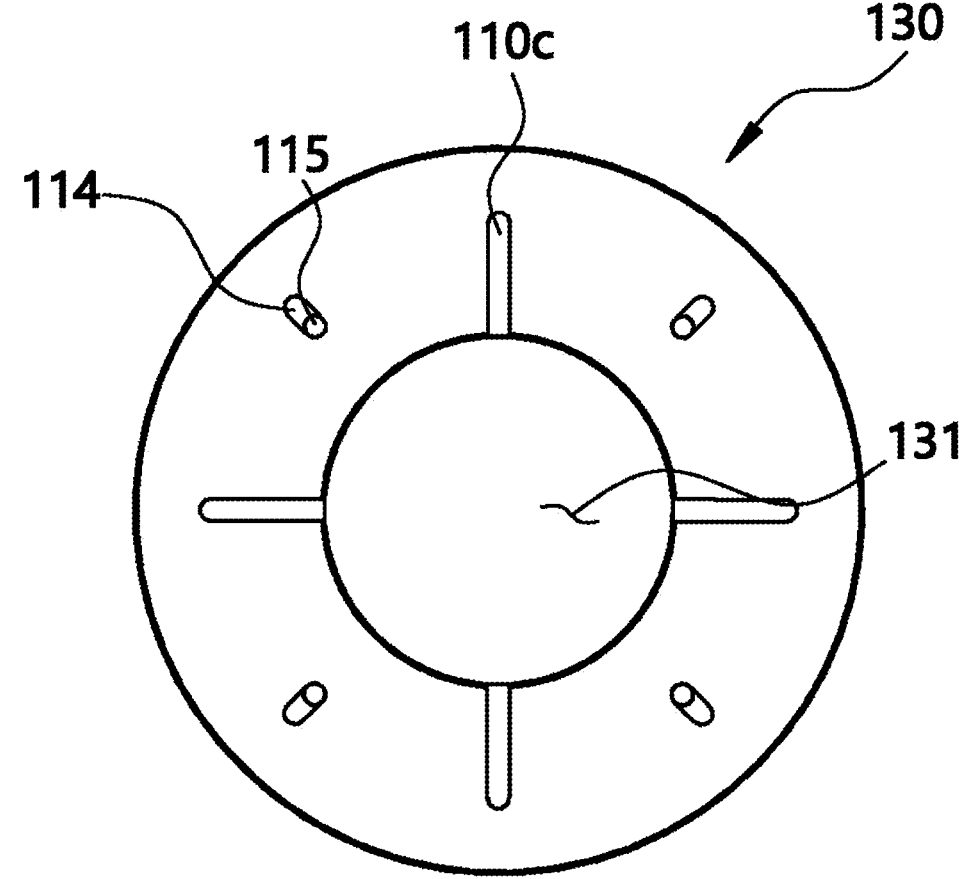

[FIG. 15]
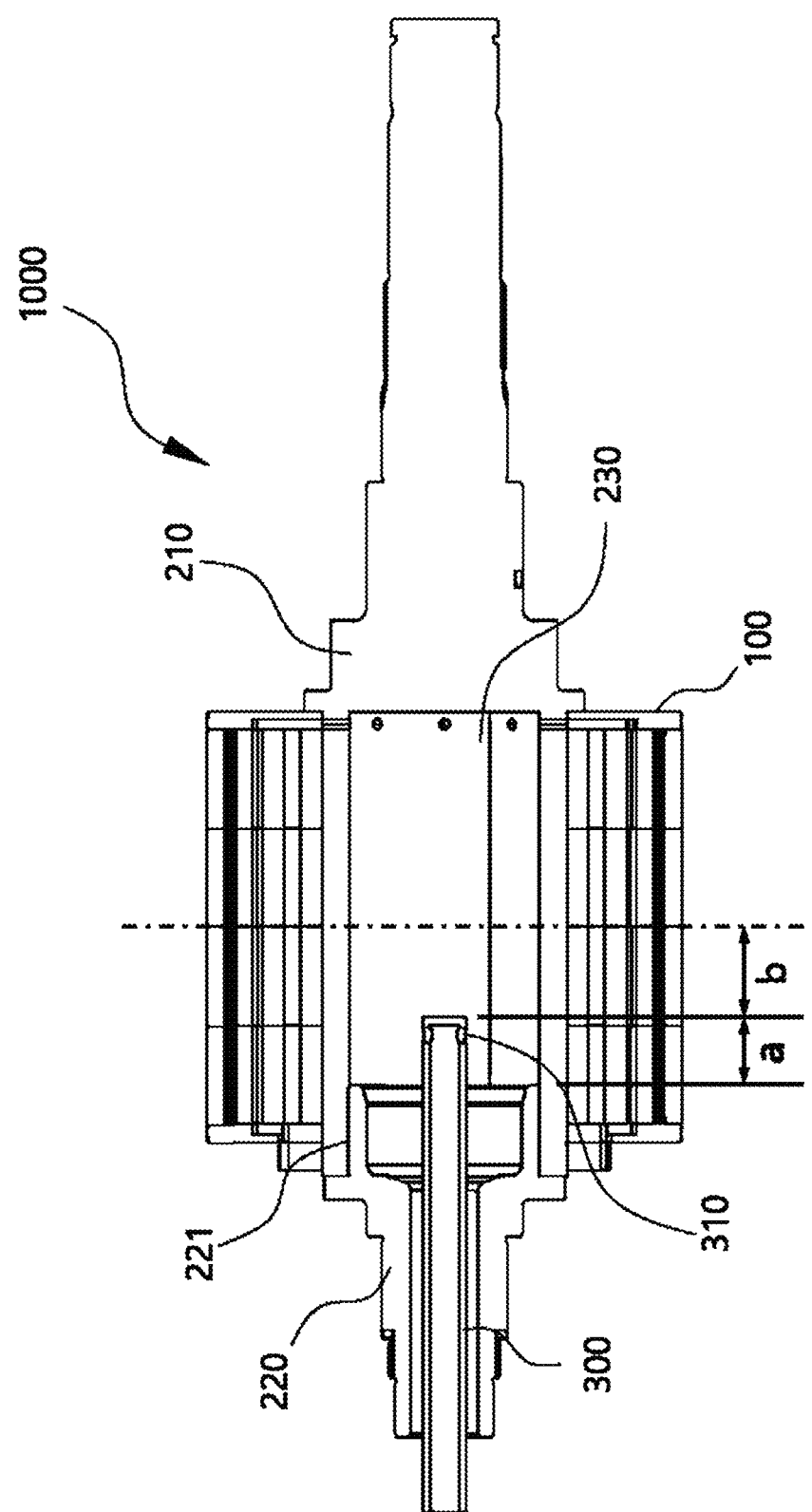

ROTOR MODULE WITH COOLING STRUCTURE

CROSS-REFERENCE TO RELATED APPLICATIONS

This application claims priority under 35 U.S.C. § 119 to Korean Patent Application No. 10-2023-0079573, filed on Jun. 21, 2023, in the Korean Intellectual Property Office, the disclosure of which is incorporated herein by reference in its entirety.

TECHNICAL FIELD

The following disclosure relates to a rotor, and more particularly, to a rotor with improved cooling efficiency.

BACKGROUND

A heat source of a driving motor of an electric vehicle is a coil through which a current flows and an electrical steel core through which a magnetic flux flows. A temperature of corresponding parts may be increased when the motor is operated, and motor malfunction may occur when the temperature is excessively increased. In order to prevent this malfunction, it may be important to cool the heat source of the motor, and there is an oil cooling method that directly ejects oil on the heat source of the motor, and a water cooling method that indirectly cools the heat source by flowing cooling water through a water passage part of a housing.

Among the methods, the oil cooling method may be performed through a cooling pipe that ejects cooling oil to cool heat of a stator, which is a main heating element, and a part surrounding the stator. Here, the cooling oil scattered through the cooling pipe may cool the motor, which is a heating element, and oil heated by heat transfer may be stored on the bottom of the motor, oil stored on the bottom of the motor may be guided to a reducer through an inner housing passage connecting the motor with the reducer, and oil may then be used for lubrication of the reducer by churning the reducer. In addition, oil stored in a housing part of the reducer may be moved to an external heat exchanger through a pump, and oil cooled by exchanging heat with cooling water may be circulated to cool the motor again.

When performing the cooling by this conventional oil cooling method of the driving motor, there is a need for a separate cooling pipe for cooling, which thus requires more parts, and it is difficult to cool a deep part of a stator core and a rotor core. In addition, it is difficult to directly cool the rotor core when oil is ejected to the outside because the rotor core is covered by plates and the stator core/coil.

RELATED ART DOCUMENT

Patent Document (Patent Document 1) Korean Patent Laid-Open Publication No. 10-2022-0096306 entitled, "Structure for projecting cooling oil" (published on Dec. 31, 2020)

SUMMARY

An embodiment of the present disclosure is directed to providing a rotor module with a cooling structure which may more directly cool a rotor, thereby securing improved performance of a motor by the rotor directly equipped with a cooling structure including a cooling passage passing through the inside of a rotor core.

In more detail, an embodiment of the present disclosure is directed to providing a rotor module with a cooling structure which may secure improved cooling performance by positioning a cooling passage in a rotor core for the core and cooling oil to be in direct contact with each other, and easily cool an outer magnet, which is relatively difficult to cool, by positioning the passage between the outer magnet and an inner magnet.

In addition, an embodiment of the present disclosure is directed to providing a rotor module with a cooling structure which may solve an imbalance of cooling oil in the core and prevent noise, vibration and harshness (NVH) issues by installing an outlet hole, through which oil flows out, in a plate positioned at an end of the core and installing the outlet hole inward in a radial direction compared to a core passage.

In one general aspect, a rotor module with a cooling structure includes: a rotor core having a shape of a cylinder having a hollow inside, the rotor core including a cooling passage part; and a rotor shaft fitted and fixed to a center of the rotor core to rotate around a central axis of the rotor core, the rotor shaft including a cooling fluid flow passage to be filled with a cooling fluid, wherein the cooling passage part has one end communicating with the cooling fluid flow passage and the other end communicating with an outside of the rotor core.

The cooling passage part may include a first passage passing through a side of the rotor shaft and to spread the fluid from the cooling fluid flow passage to one end of the rotor core, and a second passage passing through the rotor core in an axial direction and communicating with the first passage.

The cooling passage part may further include a third passage having one end communicating with the first passage and the other end communicating with the second passage, and positioned in a radial direction, the rotor core may further include a first plate that is a flat plate having a first insertion hole in a center of the first plate, the rotor shaft is inserted into the first insertion hole, the first plate may have one surface in contact with one end surface of the rotor core, and the third passage may be in a groove shape in the one surface of the first plate.

The cooling passage part may further include a fourth passage having one end communicating with the second passage and positioned in the radial direction, and a first fluid ejection hole passing through the other end of the fourth passage, the rotor core may further include a second plate that is a flat plate having a second insertion hole in a center of the second plate, the rotor shaft is inserted into the second insertion hole, the second plate may have one surface in contact with the other end surface of the rotor core, the fourth passage may be in a groove shape in the one surface of the second plate, and the first fluid ejection hole may pass through the second plate in the axial direction.

A distance between the first fluid ejection hole and a rotation axis of the rotor core may be shorter than a distance between the second passage and the rotation axis.

A length of the fourth passage may be greater than a sum of a diameter of the second passage and a diameter of the first fluid ejection hole.

The cooling passage part may further include a fifth passage extending from one end of the third passage and communicating with the third passage, and a second fluid ejection hole passing through a distal end of the fifth passage, the fifth passage may be in a groove shape in the one surface of the first plate, and the second fluid ejection hole may pass through the first plate in the axial direction.

A distance between the second fluid ejection hole and the rotation axis of the rotor core may be shorter than a distance between the second passage and the rotation axis.

The cooling passage part may further include a sixth passage having one end communicating with one end of the second passage, the sixth passage is in a groove shape in the first plate, and positioned in the radial direction, a fourth fluid ejection hole passing through the first plate at the other end of the sixth passage, a seventh passage passing through a side of the rotor shaft to spread the cooling fluid from the cooling fluid flow passage to the other end of the rotor core, and an eighth passage having one end communicating with the seventh passage and the other end communicating with the second passage, the eighth passage is in a groove shape in the second plate, and positioned in the radial direction.

The rotor module may further include a supply pipe to supply the cooling fluid into the cooling fluid flow passage, wherein the rotor shaft further includes a first part including the cooling fluid flow passage, and an open side of the cooling fluid flow passage, where the rotor core is fitted to a side of the first part, a second part including a press-fitting part positioned at one end of the second part, the press-fitting part is press-fitted to one side of the first part, where one end of the supply pipe is fitted to the one end of the second part, and the supply pipe is fitted to the second part so that one end of the supply pipe is positioned closer to one end of the press-fitting part of the second part than a center of the cooling fluid flow passage in an axial direction.

BRIEF DESCRIPTION OF THE DRAWINGS

FIG. 1 is a perspective view showing an axial cross-section of a rotor module with a cooling structure of the present disclosure.

FIG. 2 is an axial cross-sectional view of the rotor module with a cooling structure of the present disclosure.

FIG. 3 is a radial cross-sectional view of the rotor module with a cooling structure of the present disclosure.

FIGS. 4 and 5 are partial cross-sectional views of the rotor module with a cooling structure of the present disclosure that shows a fourth passage.

FIG. 6 is a plan view of a first plate of the present disclosure.

FIG. 7 is a plan view of a second plate of the present disclosure.

FIG. 8 is a partial perspective view of the rotor module with a cooling structure of the present disclosure that shows a protrusion.

FIG. 9 is an axial cross-sectional view of a rotor module with a cooling structure according to a first embodiment of a cooling passage part of the present disclosure.

FIG. 10 is a plan view of a first plate according to a first embodiment of a cooling passage part of the present disclosure.

FIG. 11 is a plan view of a second plate according to a second embodiment of a cooling passage part of the present disclosure.

FIG. 12 is a plan view of a first plate according to a third embodiment of a cooling passage part of the present disclosure.

FIG. 13 is an axial cross-sectional view of a rotor module with a cooling structure according to a third embodiment of a cooling passage part of the present disclosure.

FIG. 14 is a plan view of a second plate according to a third embodiment of a cooling passage part of the present disclosure.

FIG. 15 is an axial cross-sectional view of a rotor module with a cooling structure according to an embodiment of the present disclosure.

DETAILED DESCRIPTION OF EMBODIMENTS

Hereinafter, the spirit of the present disclosure is described in more detail with reference to the accompanying drawings. Terms and words used in the specification and claims are not to be construed as general or dictionary meanings, and are to be construed as meanings and concepts meeting the spirit of the present disclosure based on a principle in which the inventors may appropriately define the concepts of the terms in order to describe their inventions in the best mode.

Hereinafter, the description describes a basic configuration of a rotor module 1000 with a cooling structure of the present disclosure with reference to FIG. 1.

As shown in FIG. 1, the present disclosure may include a rotor core 100 and a rotor shaft 200. In more detail, the rotor core 100 may have a shape of a cylinder having a hollow inside, and include a magnet generating an electric field therein. Here, the magnets may have two layers formed in a radial direction. In addition, the rotor shaft 200 may be fitted to and fixed to the center of the rotor core 100, may be rotated around a central axis of the rotor core 100, and may include a cooling fluid flow passage 230 filled with a cooling fluid.

Here, the rotor core 100 may include a cooling passage part 110. The cooling passage part 110 may have one end communicating with the cooling fluid flow passage 230 and the other end communicating with the outside of the rotor core 100. The cooling passage part 110 may induce the cooling fluid to flow also in the rotor core, thereby more directly cooling the rotor, thereby securing improved performance of a motor.

Hereinafter, the description describes the cooling passage part 110 of the present disclosure in more detail with reference to FIGS. 2 to 5.

As shown in FIG. 2, the cooling passage part 110 may include a first passage 111 passing through a side of the rotor shaft 200 in the radial direction and spreading the fluid from the cooling fluid flow passage 230 to the rotor core 100, and a second passage 112 passing through the rotor core 100 in an axial direction and communicating with the first passage 111. In more detail, the first passage 111 may be positioned to correspond to one end of the rotor core 100, and two or more first passages 111 may be positioned on the side of the rotor shaft 200 in a circumferential direction. The cooling passage part 110 including the first passage 111 and the second passage 112 may induce the fluid flowing in the cooling fluid flow passage 230 to flow out of the rotor shaft 200 and flow through the inside of the rotor core 100, which may more directly cool the rotor to thus secure the improved performance of the motor.

In addition, as shown in FIG. 3, the second passage 112 may be positioned between an outer magnet 140 and an inner magnet 150 which are inserted into the rotor core 100, and two or more second passages 112 may be positioned on the side of the rotor core 100 in the circumferential direction. That is, a distance between the second passage 112 and a rotation axis of the rotor core 100 may be shorter than a distance between the outer magnet 140 of the rotor core 100 and the rotation axis, and may be longer than a distance between the inner magnet 150 of the rotor core 100 and the rotation axis. Accordingly, the cooling passage part 110 may easily cool the outer magnet 140, which is relatively difficult to cool.

In addition, the cooling passage part 110 may include a third passage 113 communicating the first passage 111 with the second passage 112. In more detail, the third passage 113 may have one end communicating with the first passage 111 and the other end communicating with the second passage 112, and may be positioned in the radial direction. In an embodiment, the third passage 113 may be positioned at the rotor core 100 or may be positioned at the first plate 120. The description describes the first plate 120 below.

In addition, the cooling passage part 110 may include a fourth passage 114 having one end communicating with the second passage 112 and positioned in the radial direction, and a first fluid ejection hole 115 passing through the other end of the fourth passage 114. In an embodiment, the fourth passage 114 may be positioned at the rotor core 100 or may be positioned at a second plate 130. The description describes the second plate 130 below. Here, the third passage 113 and the fourth passage 114 may respectively be positioned at opposite sides of the rotor core 100. That is, the third passage 113 and the first passage 111 communicating with the third passage 113 may be positioned at one end of the rotor core 100, and the fourth passage 114 may be positioned at the other end of the rotor core 100.

That is, the cooling fluid may flow out of the rotor shaft 200 from in the cooling fluid flow passage through the first passage 111, may then be moved to an opposite side of the rotation axis, that is, in the radial direction, through the third passage 113, may pass through the rotor core 100 in the axial direction through the second passage 112, and may be moved again toward the rotation axis through the fourth passage 114 after completely filling the second passage 112. The fluid may be ejected to the outside through the first fluid ejection hole 115. Accordingly, as shown in FIG. 4, the first fluid ejection hole 115 may be positioned in such a way that a distance R2 between the first fluid ejection hole and the rotation axis of the rotor core 100 is shorter than a distance R1 between the second passage 111 and the rotation axis.

According to the configuration of the cooling passage part 110 as described above, the fluid flowing in the cooling passage part 110 may be moved back toward the rotation axis through the fourth passage 114 just before flowing out of the rotor core 100, thus preventing the cooling fluid from being pushed to the outside of the passage due to a centrifugal force of the rotor core 100 that is continuously rotated, and finally preventing noise, vibration and harshness (NVH) issues from occurring due to a flow imbalance of oil in the core.

Furthermore, as shown in FIG. 5, a length L of the fourth passage 114 may be greater than a sum of a diameter d1 of the second passage 112 and a diameter d2 of the first fluid ejection hole 115. That is, a certain gap may be formed between the second passage 112 and the first fluid ejection hole 115, thereby maximizing an effect of the fourth passage 114 described above, and preventing the cooling fluid from being ejected through the first fluid ejection hole 115 before the fluid completely fills the second passage 112. Accordingly, the fluid may flow uniformly along the second passage 112 positioned in the core, thus also constantly maintaining a flow rate ejected through the first fluid ejection hole 115.

Hereinafter, the description describes the first plate 120 and the second plate 130 of the present disclosure in more detail with reference to FIGS. 6 to 8.

The rotor core 100 may include the first plate 120 which is a flat plate stacked on one end surface. As shown in FIG. 6, the first plate 120 may have a first insertion hole 121 which is formed in its center and into which the rotor shaft 200 is inserted. The first plate 120 may have a third passage 113 formed in a groove shape in one surface in contact with one end surface of the rotor core 100. The third passages 113 may be positioned in the first plate 120 and the same number of third passages 113 as the numbers of first passages 111 and second passages 112 may be spaced apart from each other at regular intervals. The rotor core 100 may include the first plate 120 which is the flat plate in which the third passage 113 is formed as a component separated therefrom to thus prevent interference from occurring between the outer magnet 140 and the inner magnet 150 of the rotor core 100 and the third passage 113.

In addition, as shown in FIG. 7, the rotor core 100 may include the second plate 130 having a second insertion hole 132 which is formed in its center and into which the rotor shaft 200 is inserted. The second plate 130 may have one surface in contact with the other end surface of the rotor core 100, and the fourth passage 114 may be formed in a groove shape in one surface of the second plate 130 that is in contact with the rotor core 100. The first fluid ejection hole 115 may pass through the second plate 130 in the axial direction. The same numbers of fourth passages 114 and first fluid ejection holes 115 as the number of the second passages 112 may be provided.

Furthermore, as shown in FIG. 8, the second plate 130 may include a protrusion 131 protruding along a circumference of the second insertion hole 132. Here, a region where the protrusion 131 protrudes may overlap at least a portion of a region which the first fluid ejection hole 115 passes through. Accordingly, a groove may be positioned in a side of the protrusion 131 as much as the depth of the region in which the first fluid ejection hole 115 is positioned. Accordingly, the cooling fluid ejected through the first fluid ejection hole 115 may be ejected to the opposite side of the rotation axis, and an outer surface of the rotor core 100 may be cooled more efficiently.

Hereinafter, the description describes a first embodiment of the cooling passage part 110 in more detail with reference to FIGS. 9 and 10.

As shown in FIG. 9, the cooling passage part 110 may include a fifth passage 116 extending from one end of the third passage 113 and communicating with the third passage 113, and a second fluid ejection hole 117 passing through a distal end of the fifth passage 116. Here, as shown in FIG. 10, the fifth passage 116 may be formed in a groove shape in one surface of the first plate 120 and may extend from the third passage 113. The second fluid ejection hole 117 may pass through the first plate 120 in the axial direction. Accordingly, the fluid may flow uniformly along the second passage 112 positioned at the core, thus also constantly maintaining the flow rate ejected through the first fluid ejection hole 115.

In addition, the fifth passage 116 may be bent to form a U-shape with the third passage 113, and the second fluid ejection hole 117 may be spaced apart from the third passage 113 by a predetermined interval in the circumferential direction. Accordingly, the cooling fluid entering the third passage 113 may be separated to have one part flowing into the second passage 112, and the other part flowing into the fifth passage 116. As a result, the cooling fluid may be ejected while being divided into both sides of the rotor core 100.

Here, a distance between the second fluid ejection hole 117 and the rotation axis of the rotor core 100 may be shorter than a distance between the second passage 112 and the rotation axis. In detail, the distance between the second fluid ejection hole 117 and the rotation axis of the rotor core 100 may be the same as a distance between the first fluid ejection hole 115 and the rotation axis of the rotor core 100. Accordingly, the fluid may be ejected at the same flow rate on both the sides of the rotor core 100, thus uniformly cooling the rotor core 100.

Hereinafter, the description describes a second embodiment of the cooling passage part 110 in more detail with reference to FIG. 11.

As shown in FIG. 11, the cooling passage part 110 may include a third fluid ejection hole 118 passing through the third passage 113. In more detail, the third fluid ejection hole 118 may be spaced apart from the other end of the third passage 113, that is, a position communicating with the second passage 112 toward one end of the third passage 113 by a predetermined interval. Here, the third fluid ejection hole 118 may pass through the first plate 120 in the axial direction. When using a second embodiment of the cooling passage part 110, the cooling fluid entering the third passage 113 may be separated to have one part flowing into the third fluid ejection hole 118, and the other part flowing into the second passage 112. As a result, the cooling fluid may be ejected while being divided into both the sides of the rotor core 100.

Here, a distance between the third fluid ejection hole 118 and the rotation axis of the rotor core 100 may be the same as the distance between the first fluid ejection hole 115 and the rotation axis of the rotor core 100. That is, a distance between the other end of the third passage 113 and the third fluid ejection hole 118 may be the same as a length of the fourth passage 114. Accordingly, the cooling fluid may be prevented from being pushed to the outside of the passage due to the centrifugal force of the rotor core 100 that is continuously rotated, and the fluid may be ejected at the same flow rate on both the sides of the rotor core 100, thus uniformly cooling the rotor core 100.

Hereinafter, the description describes a third embodiment of the cooling passage part 110 in more detail with reference to FIGS. 12 to 14.

As shown in FIG. 12, the cooling passage part 110 may include a sixth passage 119 positioned at the first plate 120, having one end communicating with one end of the second passage 112, and positioned in the radial direction, and a fourth fluid ejection hole 110a passing through the other end of the sixth passage 119. That is, at least a part of one end of the second passage 112 may communicate with the third passage 113, and the other part may communicate with the sixth passage 119 and the fourth fluid ejection hole 110a.

In addition, as shown in FIG. 13, the cooling passage part 110 may include a seventh passage 110b passing through the side of the rotor shaft 200 in the radial direction and spreading the fluid from the cooling fluid flow passage 230 to the rotor core 100. The seventh passage 110b may correspond to the other end of the rotor core 100, that is, may be formed on the opposite side of the first passage 111.

In addition, as shown in FIG. 14, the cooling passage part 110 may include an eighth passage 110c communicating the seventh passage 110b with the other end of the second passage 112. In more detail, the eighth passage 110c may have one end communicating with the seventh passage 110b and the other end communicating with the other end of the second passage 112, and may be positioned in the radial direction. Here, the eighth passage 110c may be formed in a groove shape in the second plate 130, and at least a part of the other end of the second passage 112 may communicate with the eighth passage 110c, and the other part may communicate with the fourth passage 114 and the first fluid ejection hole 1105.

Here, the sixth passage 119 and the fourth fluid ejection hole 110a of the first plate 120 may be positioned in a straight line with the seventh passage 110b of the second plate 130 in the axial direction, and the third passage 113 of the first plate 120 may be positioned in a straight line with the fourth passage 114 and the first fluid ejection hole 115 of the second plate 130 in the axial direction.

In addition, the number of the sixth passages 119 of the first plate 120 may be the same as the number of the third passages 113, and the number of the seventh passages 110b of the second plate 130 may also be the same as the number of the fourth passages 114. Furthermore, the sixth passage 119 and the third passage 113 may be alternately disposed with each other, and the seventh passage 110b and fourth passage 114 may also be alternately disposed with each other.

As shown in FIG. 13, the fluid may be ejected at the same flow rate on both the sides of the rotor core 100 by this structure. However, unlike a first embodiment or a second embodiment of the cooling passage part 110, the fluid ejected in the cooling fluid flow passage 230 may flow through the passages separated from each other in different directions, thus preventing deviation in the flow rate or a pressure from occurring at a passage corresponding to a branch point (or the third passage 113) and preventing excessive use of the cooling fluid.

Hereinafter, the description describes the rotor shaft 200 in more detail with reference to FIG. 15.

As shown in FIG. 15, the rotor module 1000 with the cooling structure of the present disclosure may further include a supply pipe 300 for supplying the cooling fluid into the cooling fluid flow passage 230. Here, the supply pipe 300 may have one end fitted to the rotor shaft 200, and a cooling fluid supply hole 310 may be positioned in a side of the inserted one end. In addition, the rotor shaft 200 may include a first part 210 in which the rotor core 100 is fitted to a side, the cooling fluid flow passage 230 is positioned, and one side of the cooling fluid flow passage 230 is open, and a second part 220 in which a press-fitting part 221 is positioned at one end, the press-fitting part 221 is press-fitted to one side of the first part 210, and one end of the supply pipe 300 is fitted to one end. Here, the supply pipe 300 may be fitted to the second part 220 for its one end, that is, the cooling fluid supply hole 310 to be positioned to be closer to one end of the press-fitting part 221 of the second part 220 than the center of the cooling fluid flow passage 230 in the axial direction. Accordingly, oil may be minimally isolated and flow smoothly into a core inlet.

As set forth above, the rotor module with the cooling structure of the present disclosure may more directly cool the rotor, and thereby secure the improved performance of the motor by directly equipping the rotor with the cooling structure including the cooling passage passing through the inside of the rotor core.

In more detail, the rotor module with the cooling structure of the present disclosure may secure the improved cooling performance by positioning the cooling passage in the rotor core for the core and cooling oil to be in direct contact with each other, and easily cool the outer magnet, which is relatively difficult to cool, by positioning the passage between the outer magnet and the inner magnet.

In addition, the rotor module with the cooling structure of the present disclosure may solve the imbalance of cooling oil in the core and prevent the noise, vibration and harshness (NVH) issues by installing the outlet hole, through which oil flows out, in the plate positioned at the end of the core and installing the outlet hole inward in the radial direction compared to the core passage.

The spirit of the present disclosure should not be limited to the embodiments described above. The present disclosure may be applied to various fields and may be variously modified by those skilled in the art without departing from the scope of the present disclosure claimed in the claims. Therefore, it is obvious to those skilled in the art that these alterations and modifications fall within the scope of the present disclosure.

What is claimed is:

1. A rotor module with a cooling structure, the rotor module comprising:
a rotor core having a shape of a cylinder having a hollow inside, the rotor core including:
a cooling passage part;
a first plate that is a flat plate including (i) a first insertion hole in a center of the first plate, and (ii) one surface in contact with one end surface of the rotor core; and
a second plate that is a flat plate including (i) a second insertion hole in a center of the second plate, and (ii) one surface in contact with the other end surface of the rotor core; and
a rotor shaft fitted and fixed to a center of the rotor core to rotate around a central axis of the rotor core, the rotor shaft including a cooling fluid flow passage to be filled with a cooling fluid, wherein the rotor shaft is inserted into the first insertion hole and the second insertion hole,
wherein the cooling passage part includes:
one end communicating with the cooling fluid flow passage and the other end communicating with an outside of the rotor core;
a first passage passing through a side of the rotor shaft to spread the cooling fluid from the cooling fluid flow passage to one end of the rotor core;
a second passage passing through the rotor core in an axial direction and communicating with the first passage;
a third passage having one end communicating with the first passage and the other end communicating with the second passage, and positioned in a radial direction, where the third passage is in a groove shape in the one surface of the first plate;
a fourth passage having one end communicating with the second passage and positioned in the radial direction, where the fourth passage is in a groove shape in the one surface of the second plate;
a first fluid ejection hole passing through the other end of the fourth passage, the first fluid ejection hole passes through the second plate in the axial direction; and
a sixth passage having one end communicating with one end of the second passage, where the sixth passage is in a groove shape in the first plate, and positioned in the radial direction, and a fourth fluid ejection hole passing through the first plate at the other end of the sixth passage,
wherein a portion of the cooling fluid flowing through the cooling passage part passes through the second passage once from the one end to the other end and is then sprayed toward other end side of the rotor core through the first fluid ejection hole, and another portion of the cooling fluid flowing through the cooling fluid flow passage passes through the second passage once from a tail end to a head end and is then sprayed toward the head end of the rotor core through the fourth fluid ejection hole.

2. The rotor module of claim 1, wherein a distance between the first fluid ejection hole and a rotation axis of the rotor core is shorter than a distance between the second passage and the rotation axis.

3. The rotor module of claim 1, wherein a length of the fourth passage is greater than a sum of a diameter of the second passage and a diameter of the first fluid ejection hole.

4. The rotor module of claim 1, wherein the cooling passage part further includes a fifth passage extending from one end of the third passage and communicating with the third passage, and a second fluid ejection hole passing through a distal end of the fifth passage,
the fifth passage is in a groove shape in the one surface of the first plate, and
the second fluid ejection hole passes through the first plate in the axial direction.

5. The rotor module of claim 4, wherein a distance between the second fluid ejection hole and the rotation axis of the rotor core is shorter than a distance between the second passage and the rotation axis.

6. The rotor module of claim 1, wherein the cooling passage part further includes
a seventh passage passing through a side of the rotor shaft to spread the cooling fluid from the cooling fluid flow passage to the other end of the rotor core, and
an eighth passage having one end communicating with the seventh passage and the other end communicating with the second passage, the eighth passage is in a groove shape in the second plate, and positioned in the radial direction.

7. The rotor module of claim 6, wherein a distance between the first fluid ejection hole and a rotation axis of the rotor core is shorter than a distance between the second passage and the rotation axis.

8. The rotor module of claim 1, further comprising a supply pipe to supply the cooling fluid into the cooling fluid flow passage,
wherein the rotor shaft further includes
a first part including the cooling fluid flow passage, and an open side of the cooling fluid flow passage, where the rotor core is fitted to a side of the first part, and
a second part including a press-fitting part positioned at one end of the second part, the press-fitting part is press-fitted to one side of the first part, where one end of the supply pipe is fitted to the one end of the second part, and
the supply pipe is fitted to the second part so that one end of the supply pipe is positioned closer to one end of the press-fitting part of the second part than a center of the cooling fluid flow passage in an axial direction.

* * * * *